US010761597B2

(12) United States Patent
Xu et al.

(10) Patent No.: US 10,761,597 B2
(45) Date of Patent: Sep. 1, 2020

(54) USING AUGMENTED REALITY TECHNOLOGY TO ADDRESS NEGATIVE EMOTIONAL STATES

(71) Applicant: INTERNATIONAL BUSINESS MACHINES CORPORATION, Armonk, NY (US)

(72) Inventors: Cheng Xu, Beijing (CN); Su Liu, Austin, TX (US); Peng Hui Jiang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/163,681

(22) Filed: Oct. 18, 2018

(65) Prior Publication Data
US 2020/0125163 A1    Apr. 23, 2020

(51) Int. Cl.
*G06F 3/01* (2006.01)
*G06T 19/00* (2011.01)
*G06T 7/90* (2017.01)

(52) U.S. Cl.
CPC ............... *G06F 3/011* (2013.01); *G06T 7/90* (2017.01); *G06T 19/006* (2013.01); *G06F 2203/011* (2013.01)

(58) Field of Classification Search
None
See application file for complete search history.

(56) References Cited

U.S. PATENT DOCUMENTS

| 8,921,473 | B1* | 12/2014 | Hyman | .................... | C08K 3/04 423/445 R |
| 9,514,481 | B2 | 12/2016 | Kumar et al. | | |
| 2003/0130566 | A1* | 7/2003 | Hawkes | ................. | G06Q 30/02 600/300 |
| 2007/0208569 | A1* | 9/2007 | Subramanian | ...... | G10L 19/0018 704/270 |
| 2015/0348503 | A1* | 12/2015 | Woo | .......................... | G09G 5/02 345/604 |

(Continued)

FOREIGN PATENT DOCUMENTS

WO     2015054562 A1    4/2015

OTHER PUBLICATIONS

Cherry, "The Color Psychology of Black", verywellmind, May 24, 2018, 31 pages.

(Continued)

*Primary Examiner* — Yingchun He
(74) *Attorney, Agent, or Firm* — Tutunjian & Bitetto, P.C.; Vazken Alexanian (57) ABSTRACT

An emotional state of a user and one or more images of one or more respective objects observed by the user in an environment using an augmented reality device are received. It is determined whether the one or more objects include at least one negative impact object having a source color that can be changed to improve the emotional state of the user. In response to a determination that the one or more objects include at least one negative impact object having a source color that can be changed to improve the emotional state of the user, the augmented reality device is caused to render the at least one negative impact object with a target color assigned to improve the emotional state of the user.

15 Claims, 6 Drawing Sheets

(56) References Cited

U.S. PATENT DOCUMENTS

2016/0077547 A1* 3/2016 Aimone ................. G06F 3/012
　　　　　　　　　　　　　　　　　　　　　345/8
2018/0012417 A1　1/2018 Haseltine et al.

OTHER PUBLICATIONS

Anonymous, "Method and System for Controlling an Indoor Ambient Environment for a Patient with Different Light and Sound Needs", An IP.com Prior Art Database Technical Disclosure, Apr. 7, 2014, 4 pages.

Anonymous, "Smart Environment Based on Physiological State and Behaviors", An IP.com Prior Art Database Technical Disclosure, Dec. 20, 2016, 5 pages.

* cited by examiner

| Object_List | User_ID | Emotion_State | Emotion_Level | Render_Need | Source_Color | Target_Color |
|---|---|---|---|---|---|---|
| Sky (Outdoor) | User_A | Depression | Very | Yes | Dark Grey | Sky Blue |
| Cloud (Outdoor) | User_A | Depression | Very | Yes | Black | White |
| Lawn (Outdoor) | User_A | Depression | Very | Yes | Dark Yellow | Lawn Green |
| Ceiling (Indoor) | User_A | Depression | Very | Yes | Grey | Sky Blue |
| Wall (Indoor) | User_A | Depression | Very | Yes | Dim Grey | Aqua |
| Television Wall (Indoor) | User_A | Depression | Very | No | Light Grey | |
| Curtain | User_A | Depression | Very | No | White | |
| TV Border | User_A | Depression | Very | Yes | Black | Silver |
| TV Cabinet | User_A | Depression | Very | Yes | Brown | Green |
| Coffee Table | User_A | Depression | Very | Yes | Brown | Blue |
| Sofa | User_A | Depression | Very | Yes | Dark Brown | Hot Pink |
| Carpet | User_A | Depression | Very | Yes | Dark Grey | Light Grey |
| Laptop | User_A | Depression | Very | Yes | Black | Silver |
| Floor | User_A | Depression | Very | No | Light Yellow | |

USING AUGMENTED REALITY TECHNOLOGY TO ADDRESS NEGATIVE EMOTIONAL STATES

BACKGROUND

Technical Field

The present invention generally relates to augmented reality, and more particularly to using augmented reality technology to address negative emotional states.

Description of the Related Art

In contrast to virtual reality, in which a user is fully immersed within a virtual or simulated environment, augmented reality "augments" a real-world environment using computer-generated sensory information (e.g., visual, auditory, haptic, somatosensory and/or olfactory). The computer-generated sensory information can either add to the real-world environment (e.g., constructive) or mask aspects of the real-world environment (e.g., destructive). Augmented reality can be used to overlay or modify sensory information associated with the real-world environment, thereby enhancing the experience of a user observing the real-world environment.

SUMMARY

In accordance with another embodiment of the present invention, a system for using augmented reality to address negative emotional states is provided. The system includes an augmented reality device associated with a user, and at least one processor operatively coupled to a memory device for storing program code. The at least one processor is configured to execute program code stored on the memory device to receive an emotional state of a user and one or more images of one or more respective objects observed by the user in an environment using the augmented reality device, determine whether the one or more objects include at least one negative impact object having a source color that can be changed to improve the emotional state of the user, and, in response to a determination that the one or more objects include at least one negative impact object having a source color that can be changed to improve the emotional state of the user, cause the augmented reality device to render the at least one negative impact object with a target color assigned to improve the emotional state of the user.

In accordance with an embodiment of the present invention, a computer-implemented method for using augmented reality to address negative emotional states is provided. The method includes receiving an emotional state of a user and one or more images of one or more respective objects observed by the user in an environment using an augmented reality device, determining whether the one or more objects include at least one negative impact object having a source color that can be changed to improve the emotional state of the user, and, in response to determining that the one or more objects include at least one negative impact object having a source color that can be changed to improve the emotional state of the user, causing the augmented reality device to render the at least one negative impact object with a target color assigned to improve the emotional state of the user.

In accordance with yet another embodiment of the present invention, a computer program product is provided. The computer program product includes a non-transitory computer readable storage medium having program code embodied therewith. The program code are executable by a computer to cause the computer to perform a method for using augmented reality to address negative emotional states. The method performed by the computer includes receiving an emotional state of a user and one or more images of one or more respective objects observed by the user in an environment using an augmented reality device, determining whether the one or more objects include at least one negative impact object having a source color that can be changed to improve the emotional state of the user, and, in response to determining that the one or more objects include at least one negative impact object having a source color that can be changed to improve the emotional state of the user, causing the augmented reality device to render the at least one negative impact object with a target color assigned to improve the emotional state of the user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

People can be under constant pressure from a variety of sources (e.g., work and family), which can greatly affect people's emotions. Such emotions and emotional expressions can have a large effect on physical and mental well-being. For example, "bad" emotions (e.g., anger and sadness) can have adverse effects on health, life and work. Emotional suppression or inhibition can increase the risk of physical ailments such as, e.g., cancer, asthma and heart disease, and/or psychological problems such as, e.g., depression and anxiety. On the other hand, overly aggressive emotional expression can also lead to health issues such as, e.g., high blood pressure and increased stress.

There are many factors or stimuli within a person's environment that can affect the emotional state of the person, such as, e.g., exercise, food, stress, sleep, color, sounds, hormones, and sunlight. Such factors or stimuli can have an effect on the emotional state of a person by causing the person to become sad, stressed, excited, depression, frustrated, impatient, angry, etc., depending on the factors or stimuli. For example, color can have a great emotional and psychological impact, as color can affect senses and stimulate neurons in the brain.

The embodiments described herein provide for systems and methods that can use augmented reality (AR) technology to dynamically augment an environment, in real-time, by modifying colors of objects in the environment viewed through an AR device to improve the emotional state of a user. Illustratively, the embodiments described herein can dynamically adjust the colors of objects viewed through the AR device to increase the happiness of a sad user, increase the relaxation of a stressed user, provide a state of serenity to an angry user, etc. For example, the embodiments described herein can perform real-time emotion detection by analyzing and predicting personal emotional state and changes, and implementing the AR device to adjust the colors of the objects in real-time based on the emotion detection. In an illustrative embodiment, the augmented reality system can be implemented as a depression and anxiety relieving system (DARS) integrated with an AR device to relieve depression and anxiety of a user based on the real-time emotional state of the user.

Figure 1:
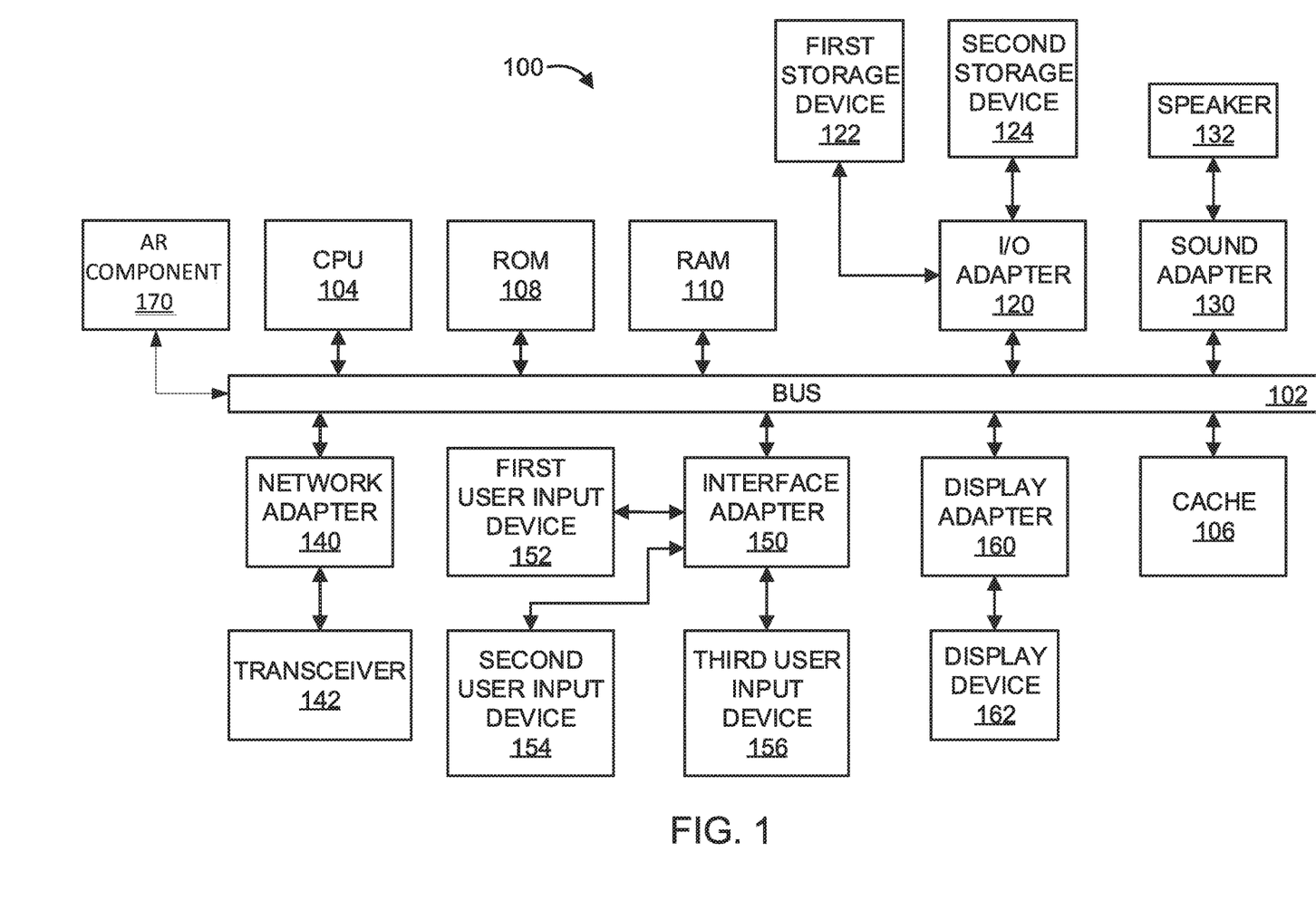
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Augmented reality (AR) component 170 may be operatively coupled to system bus 102. AR component 170 is configured to communicate with an AR device worn by a user (not shown) to perform one or more of the operations described below. AR component 170 can be implemented as a standalone special purpose hardware device, or may be implemented as software stored on a storage device. In the embodiment in which AR component 170 is software-implemented, although shown as a separate component of the computer system 100, AR component 170 can be stored on, e.g., the first storage device 122 and/or the second storage device 124. Alternatively, AR component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
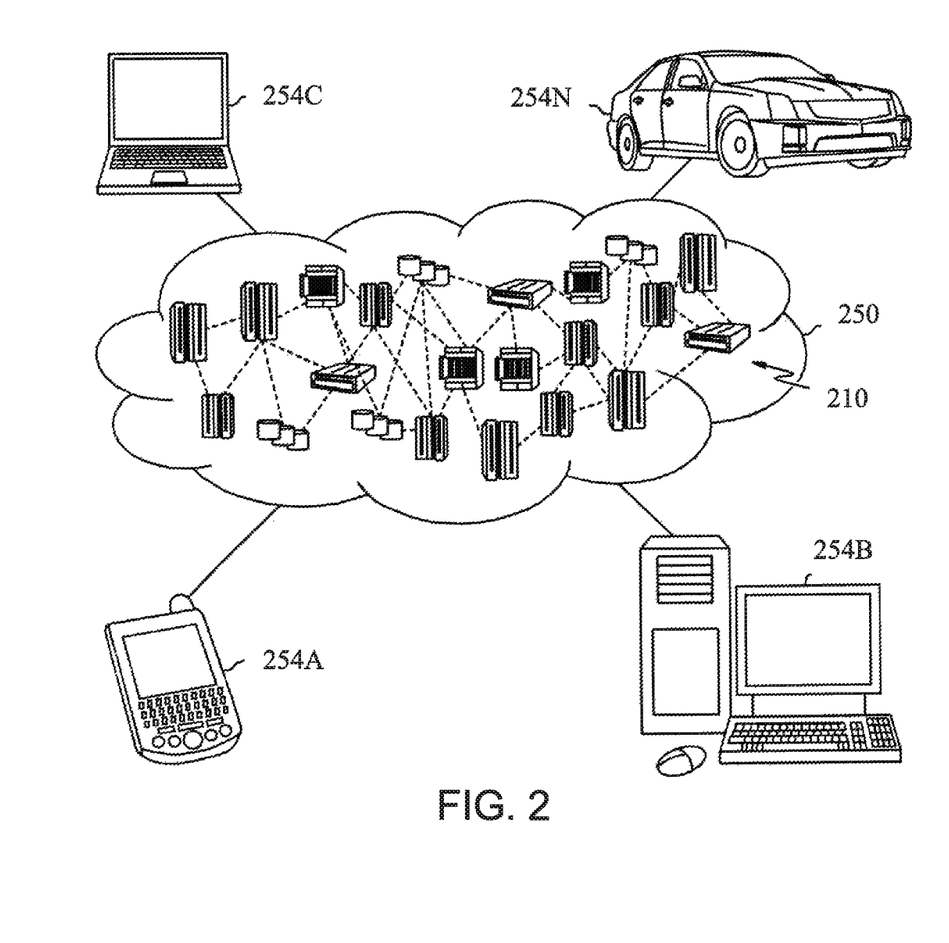
FIG. 2 is a block diagram of an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
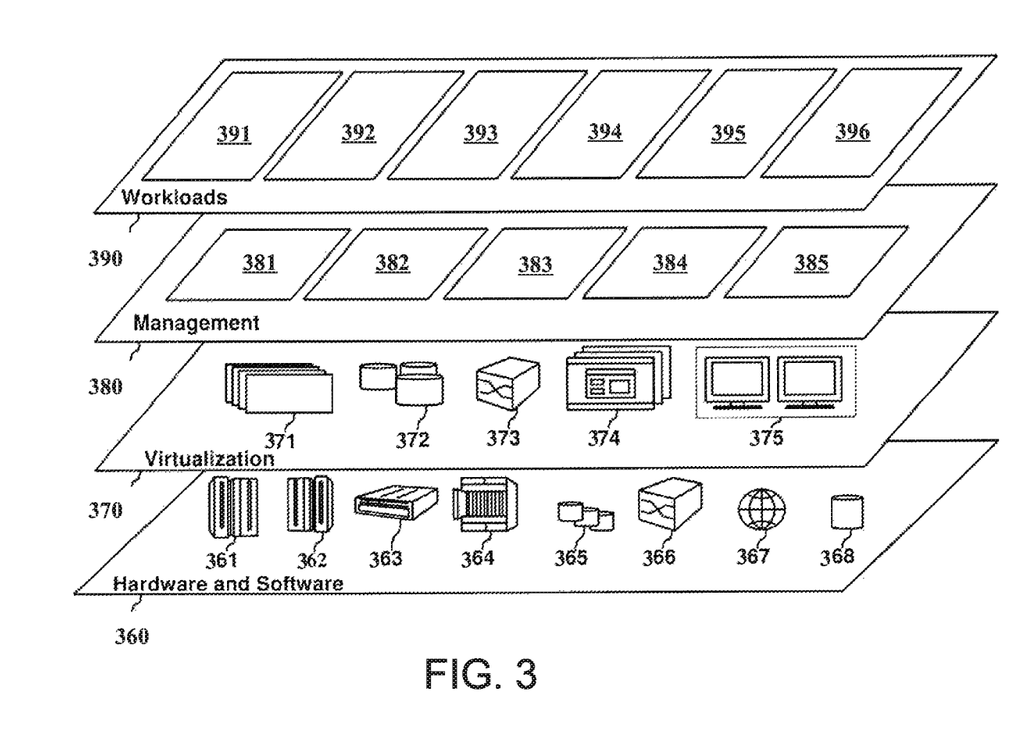
FIG. 3 is a block diagram of a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and augmented reality 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
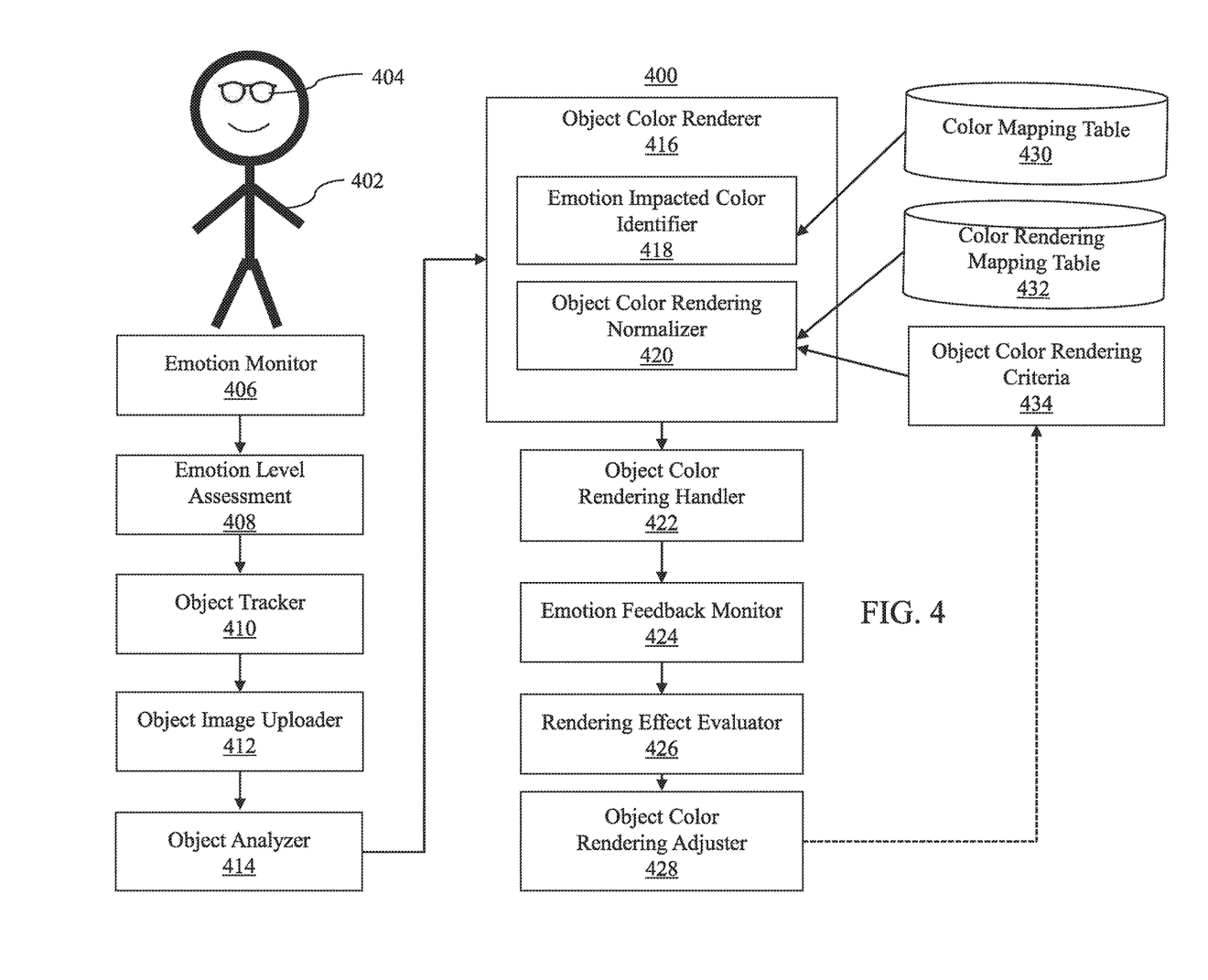
FIG. 4 is a block diagram of an augmented reality system, in accordance with an embodiment of the present invention.

With reference to FIG. 4, a block diagram is provided illustrating an overview of a system 400 for using augmented reality to improve an emotional state of user, in accordance with an embodiment of the present invention. In illustrative embodiments, the system of FIG. 4 can be implemented to relieve emotional states of depression and/or anxiety. However, such embodiments should not be considered limiting.

The system 400 includes an augmented reality (AR) device 404 associated with a user 402. In this illustrative example, the AR device 404 is embodied as a pair of eyeglasses worn on the user 402. However, the AR device 404 can be embodied as any hardware device such as, e.g., a headset or eyeglasses. The AR device 404 is configured to augment the experience of a user in an environment using computer-generated sensory information (e.g., visual, auditory, haptic, somatosensory and olfactory). For example, as will be described in further detail herein, the AR device 404 can be configured to improve the emotional state of the user 402 by changing the color of an object being observed (e.g., viewed) by the user 402 through the AR device 404.

The system 400 can further include an emotion monitor module 406 configured to monitor and receive emotional state data associated with the user 402 from one or more sources to determine an emotional state of the user 402, and an emotional level assessment module 408 configured to determine a level of the emotional state determined by the emotion monitor module 406. Examples of such sources include, but are not limited to, communication contexts and social and physical factors, such as biometrics, facial expressions, and voices. In one embodiment, the emotion monitor module 406 is configured to monitor and receive the emotional state data in real-time.

The system 400 can further include an object tracker module 410 configured to track objects observed by the user 402. In one embodiment, the object tracker module 410 can be configured to track the objects observed by the user 402 in real-time.

The system 400 can further include an object image uploader module 412 and an object analyzer 414. The object image uploader module 412 is configured to upload images of the objects observed by the user 402 to the object analyzer 414 with the current emotional state of the user 402, and the object analyzer 414 is configured to analyze the uploaded images and their original ("source") colors. For example, the object analyzer 414 can divide an object into a plurality of sub-objects, which could be independent units (e.g., a bedroom can include a nightstand, bed, lamp, bedroom lights, curtains and windows). Each sub-object can be recognized and its corresponding source color can be identified. Any suitable image recognition process can be implemented to identify each object/sub-object and their corresponding colors. The object analyzer 414 can illustratively be provided as service on a server.

The system 400 can further include an object color renderer 416 configured to determine whether the one or more objects include at least one negative impact object having a source color that can be changed to improve the emotional state of the user. The determination performed by the object color renderer 416 can be performed as a two-step process. For example, as shown in this illustrative example, the object color renderer 416 can include an emotion impacted color identifier 418 configured to determine whether the one or more objects include at least one negative impact object. In one embodiment, the emotion impacted color identifier 418 can be configured to determine whether the one or more objects include at least one negative impact object having a negative impact color according to a color mapping table 430. The color mapping table 430 can include a list of colors and a corresponding list of negative emotional traits for each of the colors. An exemplary color mapping table 430 is provided below with reference to Table 1:

TABLE 1

| Color | Negative Emotional Traits |
| --- | --- |
| Red | Aggressive and domineering, overbearing, tiring, angry and quick-tempered, ruthless, fearful and intolerant. |
| Orange | Deprivation, frustration, frivolity, immaturity. |
| Yellow | Irrationality, fear, emotional fragility, depression, anxiety, suicide. |
| Green | Boredom, stagnation, blandness, enervation. |
| Blue | Coldness, aloofness, lack of emotion, unfriendliness. |
| Violet | Introversion, decadence, suppression, inferiority. |
| Pink | Inhibition, emotional claustrophobia, emasculation, physical weakness. |
| Grey | Lack of confidence, depression, hibernation, lack of energy. |
| Black | Aloof, depressing and pessimistic, sadness, negativity. |
| White | Sterility, coldness, barriers, unfriendliness, elitism. |
| Brown | Lack of humor, heaviness, lack of sophistication. |
| Dark brown | Sadness, depression |
| Dark purple | Gloom, sadness, frustration |

As further shown in this illustrative example, the object color renderer 416 can further include an object color rendering normalizer 420 configured to determine which of the negative impact object(s) have source color(s) that can be changed to improve the emotional state of the user, and to determine target color(s) for rendering those negative impact object(s) having source color(s) that can be changed.

The following color rendering principles can be followed: (1) The target color should be a natural color for the object (e.g., a depressing gray sky can be changed to a more cheerful blue sky to improve a person's mood); (2) the target color should be close to one of the variations of the source color to improve the emotional state of the user, such as to relieve depression and/or anxiety (e.g., a serious and solemn dark gray can be changed to a more soothing and calming light grey, a dark orange which can cause frustration can be changed to a softer and gentler peach color; and (3) the target color can replace some source colors with "universal healer" colors to improve the emotional state of the user (e.g., black and yellow colors can be changed with blue sky or green colors).

The object color rendering normalizer 420 can be configured to employ a color rendering mapping table 432 including object color rendering criteria 434. The color rendering mapping table 432 can include a list of possible source colors and their corresponding negative emotional traits, and a list of possible target colors and their corresponding positive emotional traits. An color rendering mapping table 432 is provided below with reference to Table 2:

TABLE 2

| Source Color | Negative Emotional Traits | Target Color | Positive Emotional Traits |
| --- | --- | --- | --- |
| Dark orange | Frustration | Light orange (e.g., peach) | Inspires good manners, puts people at ease, comfort and warmth |
| Dark purple or dark violet | Gloom, frustration, introversion, inferiority | Light purple | Inspires glamor, romance |
| Pink | Inhibition, emotional claustrophobia, emasculation | Hot pink | Love, warmth and happiness |
| Dark brown | Sadness, depression | Ivory | Calming, reserved style of simple sophistication |
| Dark gray | Lack of confidence, depression, hibernation, lethargy | Light gray | Soothing, calming |
| Dark blue | Coldness, aloofness, depression and sadness, unfriendliness | Sky blue | Calmness, selflessness, fidelity, non-threatening |
| Dark yellow | Irrationality, fear, fragility, depression, anxiety | Sky blue | |
| Black | Aloof, depressing and pessimistic | Sky blue | |
| | | Emerald green | Inspiring and uplifting |
| | | Lime green | Youthfulness and playfulness |
| | | Aqua | Calming and healing |

The system 400 can further include an object color rendering handler 422 configured to rendering those negative impact object(s) having source color(s) that can be changed with their assigned target color(s) in the AR device 404. It is noted that if an object observed by the user 402 has a source color that does not have a negative impact on the emotional state of the user, the source color of that object is left unchanged during the rendering.

The system 400 can further include an emotion feedback monitor 424 configured to monitor changes in the emotional state of the user and/or feedback after the rendering, and a rendering effect evaluator 426 configured to evaluate the effectiveness of the rendering based on the changes. For example, if the changes indicate an improvement in emotional state (e.g., increased calmness and decreased anxiety), then the rendering is determined to have been effective and no further action need to be taken to improve the emotional state of the user. However, if the changes indicate a lack of improvement in emotional state, additional rendering can be required.

For example, the system 400 can further include object color rendering adjuster 428 configured to cause the AR device 404 to adjust the rendering of the at least one negative impact object. To do this, the object color rendering adjuster 428 can be configured to alter at least one of the mapping table and object color rendering criteria, as needed. For example, in the beginning of autumn, red leaves on trees can be very attractive and corresponding to a positive emotional state of the user. However, later in autumn, the red leaves can turn yellow, which could negatively impact the emotional state of the user. Thus, the colors of the yellow leaves can be rendered by the AR device 404 to be green.

The system 400 shown in FIG. 4 is purely exemplary, and the components/modules of the system can be implemented in any suitable arrangement in accordance with the embodiments described herein. For example, the components/modules 406-428 of the system 400 can be implemented.

Figure 5:
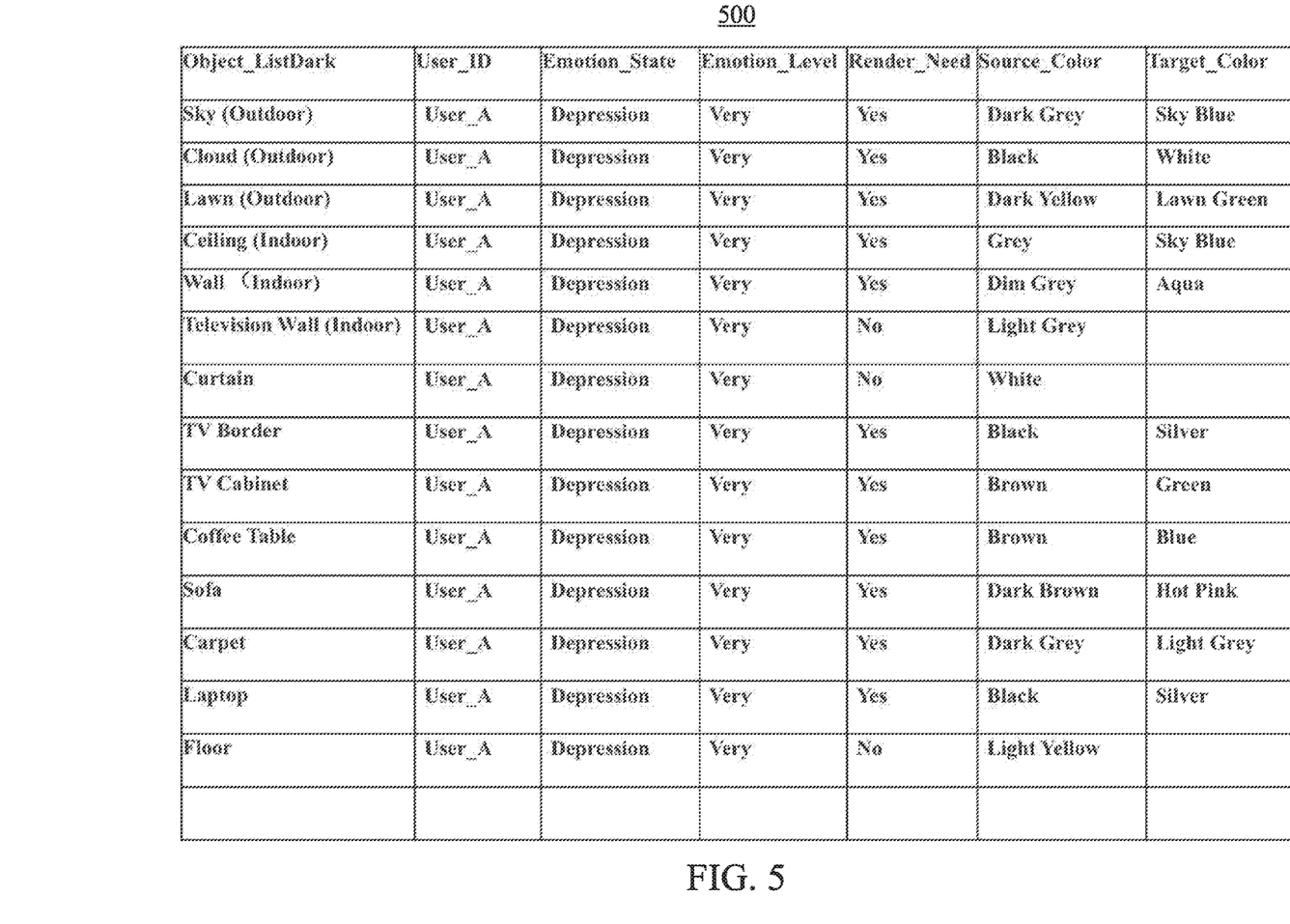
FIG. 5 is an exemplary table illustrating object color rendering, in accordance with an embodiment of the present invention.

With reference to FIG. 5, an object rendering table 500 is provided illustrating an example of object color rendering in accordance with the embodiments described herein. In this illustrative example, the object rendering table 500 includes a column ("Object_ListDark") listing objects within a living room of a home, and a column "(User_ID") of user(s) observing the object. As shown, "User_A" is the only user present within the "User_ID" column. As further shown in the object rendering table 500, the emotional state of "User_A" ("Emotion_State") is "depression" and the level of the emotional state ("Emotion_Level") is "very," meaning that "User_A" is currently very depressed. As further shown in the object rendering table 500, each object in the column "Object_ListDark" has a corresponding source color in the column "Source_Color". Out of all of the objects in the list "Object_ListDark", only the objects "Television Wall (Indoor)", "Curtain", and "Floor" have been determined to not have source colors that can be changed via rendering into new target colors using an AR device to improve the depression of "User_A". The rest of the objects in the column "Object_ListDark" are determined to have source colors that can be changed via rendering into new target colors, which are listed in column list "Target_Color". For example, the object "Sky (Outdoor)" can be rendered into "Sky Blue" instead of its current "Dark Grey" to improve the depression of "User_A".

Figure 6:
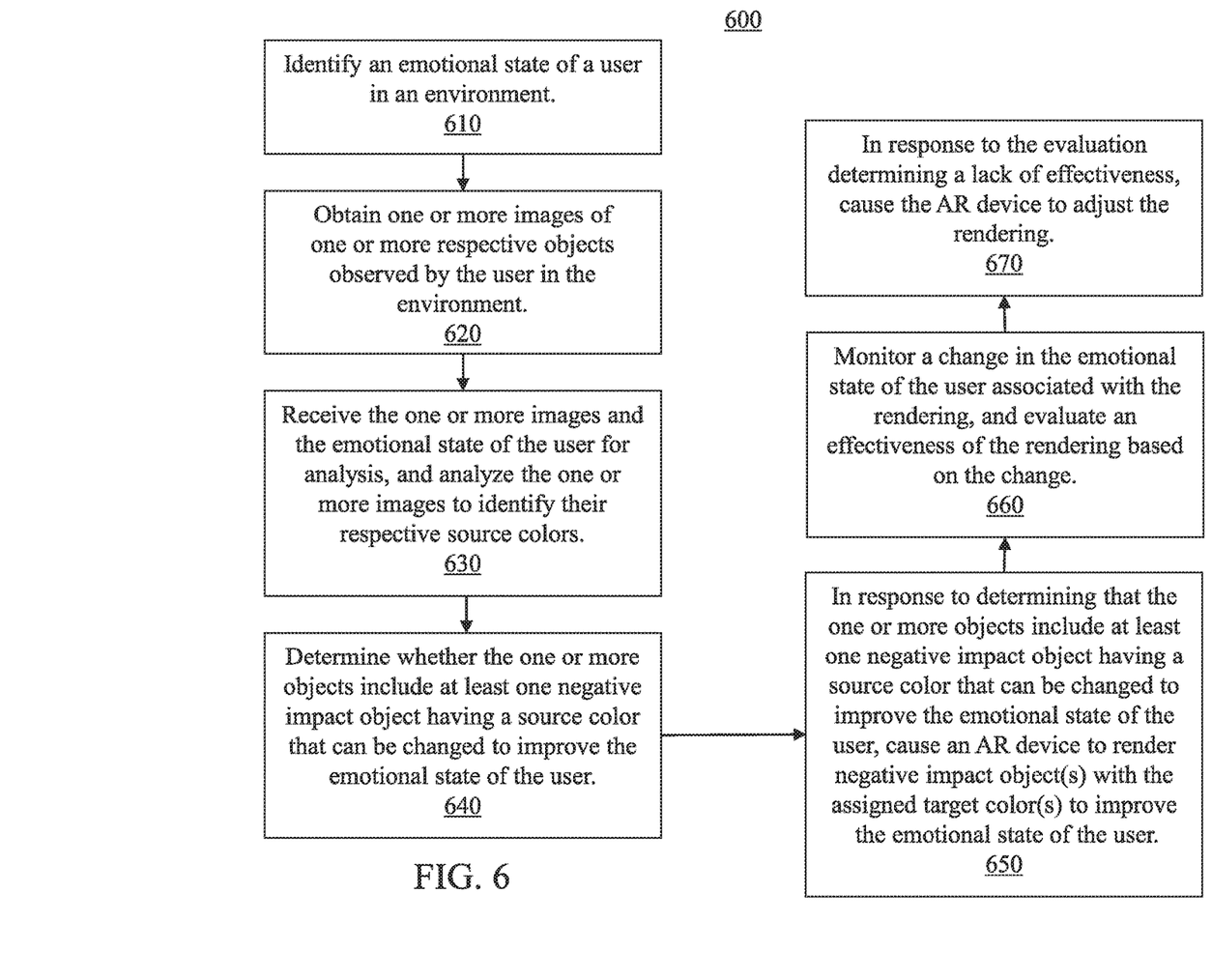
FIG. 6 is a block/flow diagram of a system/method for using augmented reality to improve emotional states, in accordance with an embodiment of the present invention.

With reference to FIG. 6, a block/flow diagram is provided illustrating an overview of a system/method 600 for using augmented reality to improve an emotional state of user, in accordance with an embodiment of the present invention. In some embodiments, the system/method of FIG. 5 can be implemented to improve emotional states associated with depression and/or anxiety. However, such embodiments should not be considered limiting.

At block 610, an emotional state of a user in an environment is identified. In one embodiment, identifying the emotional state of the user can include obtaining (e.g., monitoring and receiving) emotional state data from one or more sources, and analyzing the emotional state data to identify the emotional state. In one embodiment, identifying the emotional state of the user can further include determining a level of the emotional state (e.g., high or low).

The one or more sources can include, but are not limited to, communications, biometrics, facial expression, voices, and combinations thereof. The emotional state data can be obtained from the one or more sources in real-time. For example, the one or more sources can be in communication with an AR device associated with the user. In one embodiment, the AR device can transmit the emotional state data to at least one processing device (e.g., at least one server), and the at least one processing device can analyze the emotional state data to identify the emotional state of the user. In another embodiment, the AR device can locally analyze the emotional state data to identify the emotional state of the user.

At block 620, one or more images of one or more respective objects observed by the user in the environment using the AR device are obtained. In one embodiment, obtaining the one or more images can include tracking one or more objects observed by the user (e.g., in real-time).

At block 630, the one or more images and the emotional state of the user are received for analysis (e.g., uploaded), and the one or more images are analyzed to identify their respective source colors.

At block 640, it is determined whether the one or more objects include at least one negative impact object having a source color that can be changed to improve the emotional state of the user.

In one embodiment, the determination at block 640 can include determining whether the one or more objects include at least one negative impact object having a source color with a negative impact on emotion according to a color mapping table, determining which of the negative impact object(s) have source color(s) that can be changed to improve the emotional state of the user according to object color rendering criteria, and assigning target color(s) for rendering those negative impact object(s) having source color(s) that can be changed to improve the emotional state of the user. The color mapping table and/or the object color rendering criteria can be (pre)defined by the at least one processing device (e.g., at least one server), or the AR device (e.g., prior to receiving the one or more images and the emotional state of the user at block 630).

At block 650, in response to determining that the one or more objects include at least one negative impact object having a source color that can be changed to improve the emotional state of the user, the AR device is caused to render negative impact object(s) with the assigned target color(s) to improve the emotional state of the user.

At block 660, a change in the emotional state of the user associated with the rendering is monitored, and an effectiveness of the rendering is evaluated based on the change.

At block 670, in response to the evaluation determining a lack of effectiveness, the AR device is caused to adjust the rendering. In one embodiment, at least one the color mapping table and the object color rendering criteria are altered in response to the evaluation determining a lack of effectiveness, and the rendering is adjusted based on the alteration.

Further details regarding blocks 610-670 are described above with reference to FIGS. 4-5.

Having described preferred embodiments of a system and method for continuous control of attention for a deep learning network (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for using augmented reality to address negative emotional states, comprising:
   an augmented reality device associated with a user; and
   at least one processor device associated with the augmented reality device and operatively coupled to a memory device for storing program code, the at least one processor device being configured to execute program code stored on the memory device to:
      receive an emotional state of a user and one or more images of one or more respective objects observed by the user in an environment using the augmented reality device;
      determine, based on a color mapping table and object color rendering criteria, whether the one or more objects include at least one negative impact object having a source color that can be changed to improve the emotional state of the user;
      in response to a determination that the one or more objects include at least one negative impact object having a source color that can be changed to improve the emotional state of the user, cause the augmented reality device to render the at least one negative impact object with a target color associated with a natural color of the at least one negative impact object assigned to improve the emotional state of the user;
      monitor a change in the emotional state of the user resulting from the rendering;
      determine a lack of effectiveness of the rendering based on the change in the emotional state of the user;
      alter at least one of the color mapping table and the object color rendering criteria to generate an altered color mapping table and altered object color rendering criteria in response to the determination of the lack of effectiveness of the rendering; and
      cause the augmented reality device to adjust the rendering based on the altered color mapping table and altered object color rendering criteria to obtain an adjusted rendering of the at least one negative impact object to improve the emotional state of the user.

2. The system of claim 1, wherein the at least one processor device is further configured to execute program code stored on the memory device to receive the emotional state of the user from one or more sources in real-time.

3. The system of claim 2, wherein the one or more sources are selected from the group consisting of: communication contexts, biometrics, facial expression, voices, and combinations thereof.

4. The system of claim 1, wherein the at least one processor device is further configured to execute program code stored on the memory device to define the color mapping table and the object color rendering criteria.

5. The system of claim 1, wherein the at least one processor device is further configured to determine that the one or more objects include at least one negative impact object having a source color that can be changed to improve the emotional state of the user by:
- dividing a given one of the one or more objects into a plurality of sub-objects;
- recognizing each of the plurality of sub-objects; and
- identifying a source color of each of the plurality of sub-objects in response to the recognition.

6. A computer-implemented method for using augmented reality to address negative emotional states, comprising:
- receiving an emotional state of a user and one or more images of one or more respective objects observed by the user in an environment using an augmented reality device associated with the user;
- determining, based on a color mapping table and object color rendering criteria, that the one or more objects include at least one negative impact object having a source color that can be changed to improve the emotional state of the user;
- causing the augmented reality device to render the at least one negative impact object with a target color associated with a natural color of the at least one negative impact object assigned to improve the emotional state of the user;
- monitoring a change in the emotional state of the user resulting from the rendering;
- determining a lack of effectiveness of the rendering based on the change in the emotional state of the user;
- altering at least one of the color mapping table and the object color rendering criteria to generate an altered color mapping table and altered object color rendering criteria in response to determining the lack of effectiveness of the rendering; and
- causing the augmented reality device to adjust the rendering based on the altered color mapping table and altered object color rendering criteria to obtain an adjusted rendering of the at least one negative impact object to improve the emotional state of the user.

7. The method of claim 6, further comprising receiving the emotional state of the user from one or more sources in real-time.

8. The method of claim 7, wherein the one or more sources are selected from the group consisting of: communication contexts, biometrics, facial expression, voices, and combinations thereof.

9. The method of claim 6, further comprising defining the emotion impacted color mappings and the object color rendering criteria.

10. The method of claim 6, wherein determining that the one or more objects include at least one negative impact object having a source color that can be changed to improve the emotional state of the user further includes:
- dividing a given one of the one or more objects into a plurality of sub-objects;
- recognizing each of the plurality of sub-objects; and
- identifying a source color of each of the plurality of sub-objects in response to the recognition.

11. A computer program product comprising a non-transitory computer readable storage medium having program instructions embodied therewith, the program instructions executable by a computer to cause the computer to perform a method for using augmented reality to address negative emotional states, the method performed by the computer comprising:
- receiving an emotional state of a user and one or more images of one or more respective objects observed by the user in an environment using an augmented reality device associated with the user;
- determining, based on a color mapping table and object color rendering criteria, that the one or more objects include at least one negative impact object having a source color that can be changed to improve the emotional state of the user;
- causing the augmented reality device to render the at least one negative impact object with a target color associated with a natural color of the at least one negative impact object assigned to improve the emotional state of the user;
- monitoring a change in the emotional state of the user resulting from the rendering;
- determining a lack of effectiveness of the rendering based on the change in the emotional state of the user;
- altering at least one of the color mapping table and the object color rendering criteria to generate an altered color mapping table and altered object color rendering criteria in response to determining the lack of effectiveness of the rendering; and
- causing the augmented reality device to adjust the rendering based on the altered color mapping table and altered object color rendering criteria to obtain an adjusted rendering of the at least one negative impact object to improve the emotional state of the user.

12. The computer program product of claim 11, wherein the method further comprises receiving the emotional state of the user from one or more sources in real-time.

13. The computer program product of claim 12, wherein the one or more sources are selected from the group consisting of: communication contexts, biometrics, facial expression, voices, and combinations thereof.

14. The computer program product of claim 11, wherein the method further comprises defining the emotion impacted color mappings and the object color rendering criteria.

15. The computer program product of claim 11, wherein determining that the one or more objects include at least one negative impact object having a source color that can be changed to improve the emotional state of the user further includes:
- dividing a given one of the one or more objects into a plurality of sub-objects;
- recognizing each of the plurality of sub-objects; and
- identifying a source color of each of the plurality of sub-objects in response to the recognition.

* * * * *